Nov. 16, 1965 D. ROTHE 3,217,487
EXHAUST GAS DRIVEN SUPERCHARGER
Filed Aug. 28, 1964 2 Sheets-Sheet 1

INVENTOR
Dietmar Rothe

BY Bailey, Stephens and Huettig
ATTORNEYS

United States Patent Office 3,217,487
Patented Nov. 16, 1965

3,217,487
EXHAUST GAS DRIVEN SUPERCHARGER
Dietmar Rothe, Nurnberg, Germany, assignor to Maschinenfabrik Augsburg-Nurnberg A.G., Nurnberg, Germany
Filed Aug. 28, 1964, Ser. No. 392,796
Claims priority, application Germany, Sept. 3, 1963, M 58,056
4 Claims. (Cl. 60—13)

This invention relates to an exhaust gas driven supercharger and, in particular, to a supercharger for a multicylinder internal combustion engine, especially a vehicle engine.

In the multi-cylinder engine of this invention, the engine cylinders are joined to a common exhaust manifold, or groups of cylinders are each connected to a separate manifold and these manifolds lead to the supercharger. By-pass pipes connected to the manifolds extend into the exhaust gas tail pipe coming from the supercharger in order to by-pass the supercharger when a predetermined greater than atmospheric pressure occurs in the exhaust gas manifold.

In the operation of an exhaust gas supercharger with an internal combustion engine, the speed and output of the supercharger are ordinarily a function of the quantity of exhaust gas coming from the cylinders, as well as the pressure of the gas in the manifold. A high engine speed thus corresponds to a high supercharger speed and output and vice versa. Since the supercharger is usually designed to give an effective supercharging at a low engine speed, it can happen that, at a high engine speed, the supercharger forces too much air into the engine cylinder relative to the amount of fuel provided to the cylinder per piston cycle. In order to avoid such disadvantage, it has been suggested that the engine exhaust manifold be connected to the supercharger tail pipe by a by-pass pipe and to regulate the quantity of gas by-passing the supercharger by means of a throttle valve positioned in the by-pass pipe. However, this control means is not very effective because it usually does not start to function until a predetermined maximum gas exhaust pressure has been exceeded. Consequently, the engine often runs for an unreasonably long time with a high exhaust gas pressure resulting in unnecessarily high supercharging. Furthermore, this suggested control means is expensively elaborate.

The object of this invention is to produce a control means for the exhaust gas within a by-pass pipe in a safe and simple manner.

According to this invention, one or more butterfly valves are eccentrically mounted in the exhaust gas by-pass pipes. By using a butterfly valve as a throttle valve in an eccentric mounting, that surface of the valve which tends to open the valve under gas pressure is larger than the remaining surface of the valve which tends to keep the valve closed. If a predetermined torque in the closing direction of the valve is provided, a relatively large and uniform range of control is obtained. This torque is provided by a weighted lever connected to the pivoting axis of the valve.

The means by which the objects of the invention are obtained are described more fully with reference to the accompanying schematic drawings in which.

Figure 1:
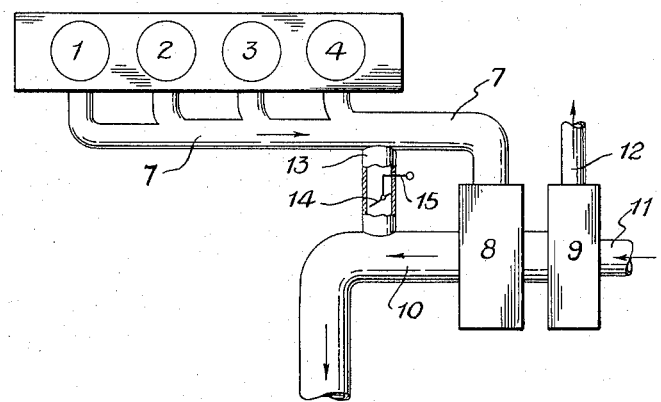
FIGURE 1 shows a four-cylinder engine with one exhaust manifold common to the engine cylinders.

As shown in FIGURE 1, engine cylinders 1 to 4 are connected to one common exhaust manifold 7 which extends into the supercharger turbine 8. Intake air blower 9 is driven by turbine 8. The exhaust gases, after passing through turbine 8, are discharged into the tail pipe 10. Intake air for blower 9 enters through pipe 11 and, upon being compressed, then passes into the intake air pipe 12 which leads to the intake air valves for the engine cylinders. By-pass pipe 13 extends between manifold 7 and tail pipe 10. An eccentrically mounted butterfly valve 14 is positioned in the by-pass pipe 13. A weighted lever 15 is connected to the axis of valve 14. When the exhaust gas pressure in manifold 7 exceeds a certain value as predetermined by the weight of lever 15, the valve 14 opens more or less according to the greater than atmospheric pressure of the exhaust gas in manifold 7 so that part of the exhaust gas flows directly from manifold 7 into tail pipe 10 with a corresponding decrease of the exhaust gas pressure in manifold 7.

Figure 2:
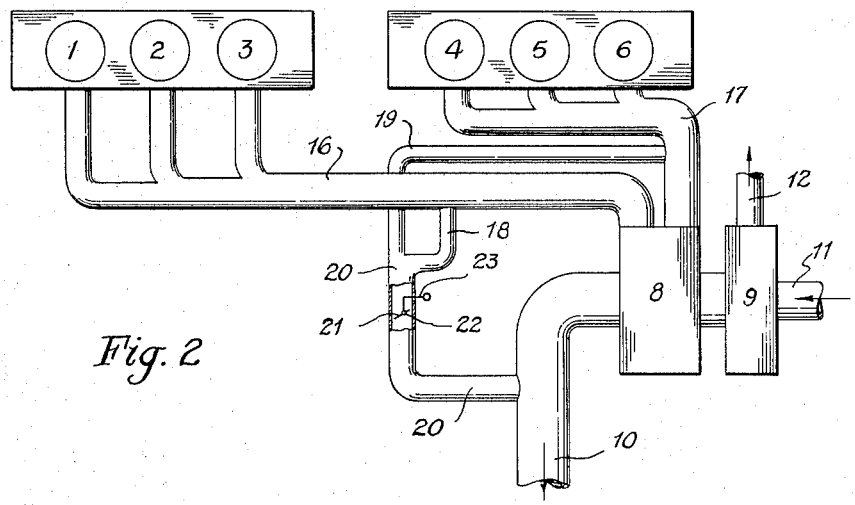
FIGURE 2 shows a six-cylinder engine with one group of three cylinders having a first exhaust manifold and a second group of three cylinders having a second exhaust manifold.

As shown in FIGURE 2, a six-cylinder engine having cylinders 1 to 6 is divided into a first group of three cylinders 1, 2 and 3 and a second group of three cylinders 4, 5 and 6. The first group of cylinders 1, 2 and 3 is joined to a common exhaust manifold 16 which continues as an exhaust pipe into turbine 8. Similarly, cylinders 4, 5 and 6 are connected to a common exhaust manifold 7 which extends through an exhaust pipe into turbine 8. As in FIGURE 1, the gases, after passing through turbine 8, are discharged into tail pipe 10. Again, intake air enters blower 9 through pipe 11 and the compressed intake air flows to the engine cylinders through intake air pipe 12. Individual by-pass pipes 18 and 19 are connected, respectively, to the manifolds 16 and 17 and extend into a common collecting pipe 20 which leads to the tail pipe 10. The cross-sectional area of by-pass pipes 18 and 19 is kept as small as possible so that the streams of gas emitted from these by-pass pipes do not affect each other or at least only significantly.

The butterfly valve 21 is eccentrically mounted in collecting pipe 20. The axis of valve 21 is joined to a weighted lever 23. Because of the eccentric mounting of valve 21, it tends to open under the pressure of the exhaust gas, which tendency is opposed by the counterweight in the form of lever 23, this counterpressure depending upon the length of the lever and its weight.

Figure 3:
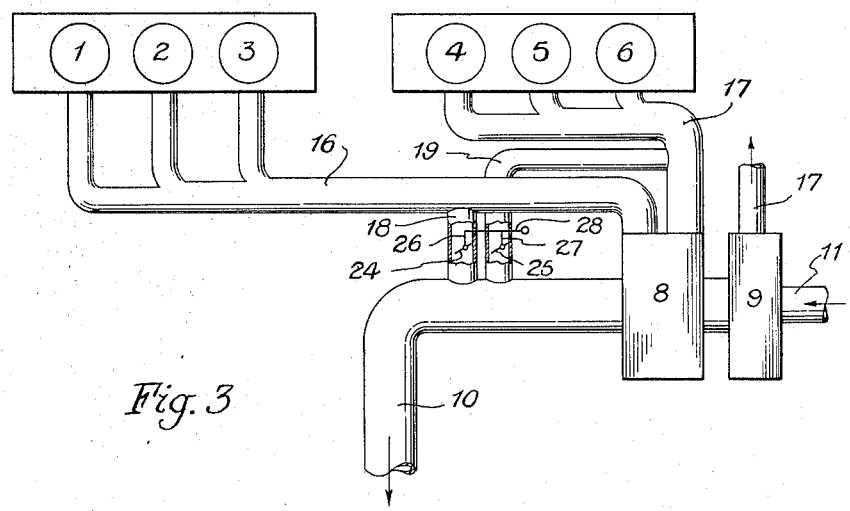
FIGURE 3 shows a modified form of the engine of FIGURE 2.

FIGURE 3 shows a modification of FIGURE 2 in which by-pass pipes 18 and 19 extend individually directly into tail pipe 10. Each by-pass pipe is provided with a separate butterfly valve 24 and 25, respectively. Levers 26 and 27 are each joined to the axis of their respective valves and to a common weighted lever 28. This modification has the advantage in that the different pressures which are periodically applied to valves 24 and 25 by reason of the two groups of cylinders being out of phase by an angle of 120° are substantially equalized by the two separate valves. This also, to a great extent, prevents a vibration of the valves. In another modification, the valves 24 and 25 are not connected and operate independently. In such case, the six cylinders are separated with respect to their exhaust manifolds into different groups than shown in FIGURES 2 and 3 so that the out-of-phase caused pressure differences in the exhaust manifolds 16 and 17 and correspondingly in by-pass pipes 18 and 19 is of secondary significance.

Instead of using an eccentrically mounted butterfly valve in this case, any other type of valve responsive to greater than atmospheric pressure can be used.

The principles of this invention are not limited solely to reciprocating piston internal combustion engines. The same principles can be used with other types of engines, such as, for example, rotary piston internal combustion engines.

Having now described the means by which the objects of the invention are obtained,

I claim:

1. In a multi-cylinder internal combustion engine having at least one exhaust manifold furnishing exhaust gas to an exhaust gas driven supercharger, a tail pipe extending from the supercharger for discharging exhaust gas therefrom, and a gas by-pass pipe between said manifold and said tail pipe, the improvement comprising a butterfly valve eccentrically mounted in said by-pass pipe and openable by the pressure of the exhaust gas in said manifold.

2. In an engine as in claim 1, said engine having at least two exhaust manifolds connected to separate groups of cylinders, respectively, and to separate exhaust pipes leading to the supercharger, the improvement further comprising a by-pass pipe for each exhaust pipe extending into a common collecting pipe leading to said tail pipe, and said butterfly valve being mounted in said collecting pipe and exposed to the gas pressure in each manifold.

3. In an engine as in claim 1, said engine having at least two exhaust manifolds connected to separate groups of cylinders, respectively, and to separate exhaust pipes leading to the supercharger, the improvement further comprising a by-pass pipe for each manifold, and a butterfly valve mounted in each by-pass pipe.

4. In an engine as in claim 3, further comprising a weighted lever joined to and common to each butterfly valve.

References Cited by the Examiner

UNITED STATES PATENTS

| 2,305,810 | 12/1942 | Muller | 60—13 |
| 2,567,486 | 9/1951 | Johansson | 60—13 |
| 3,035,408 | 5/1962 | Silver | 60—13 |
| 3,102,382 | 9/1963 | Bozzola | 60—13 |
| 3,104,520 | 9/1963 | Cazier | 60—13 |

KARL J. ALBRECHT, *Primary Examiner.*